(12) United States Patent
Fuest

(10) Patent No.: US 7,789,607 B2
(45) Date of Patent: Sep. 7, 2010

(54) DEVICE FOR FIXING AN OBJECT TO A TREE

(75) Inventor: Benjamin Fuest, Powys (GB)

(73) Assignees: Stephen Michael Ramsey Clark, Hampshire (GB); Beverley Ann Dowdall, East Sussex (GB); James Derek Christopher Challoner Dowdall, East Sussex (GB)

( * ) Notice: Subject to any disclaimer, the term of this patent is extended or adjusted under 35 U.S.C. 154(b) by 1189 days.

(21) Appl. No.: 10/533,338

(22) PCT Filed: Oct. 31, 2003

(86) PCT No.: PCT/GB03/04680

§ 371 (c)(1),
(2), (4) Date: Apr. 6, 2006

(87) PCT Pub. No.: WO2004/040188

PCT Pub. Date: May 13, 2004

(65) Prior Publication Data

US 2006/0198717 A1    Sep. 7, 2006

Related U.S. Application Data

(60) Provisional application No. 60/422,479, filed on Oct. 31, 2002.

(30) Foreign Application Priority Data

Oct. 31, 2002    (GB) ................................. 0225346.6

(51) Int. Cl.
F16B 23/00    (2006.01)
F16B 35/02    (2006.01)

(52) U.S. Cl. ................... 411/401; 411/383; 411/384
(58) Field of Classification Search ............... 411/389, 411/397, 401, 383, 384, 393; 248/546
See application file for complete search history.

(56) References Cited

U.S. PATENT DOCUMENTS

| 316,650 | A | * | 4/1885 | Perkins ...................... 411/400 |
| 350,209 | A | * | 10/1886 | Parmelee .................... 411/400 |
| 640,357 | A | * | 1/1900 | Baumgarten .............. 248/316.4 |
| 1,385,638 | A | * | 7/1921 | Miller ..................... 248/217.4 |
| 1,677,473 | A | * | 7/1928 | Gast ............................... 7/138 |
| 4,636,125 | A | | 1/1987 | Burgard |
| 5,669,592 | A | | 9/1997 | Kearful |
| 5,692,350 | A | * | 12/1997 | Murphy, Jr. .................. 52/213 |

FOREIGN PATENT DOCUMENTS

| DE | 196 05 709 | 10/1997 |
| DE | 298 00 622 | 5/1998 |
| SU | 650556 | 3/1979 |

\* cited by examiner

Primary Examiner—Jack W Lavinder
Assistant Examiner—David C Reese
(74) Attorney, Agent, or Firm—Young & Thompson

(57) ABSTRACT

A device fixes an object to a tree. The device includes an elongate body, one end of which is adapted for attachment to a tree. An object is slidably mounted on the elongate body. The device also includes a device for biasing the object towards the end of the body adapted for attachment to the tree. In use, pressure resulting from growth of the tree is transmitted to the object and pushes it along the elongate body against the bias and away from the tree.

17 Claims, 2 Drawing Sheets

DEVICE FOR FIXING AN OBJECT TO A TREE

BACKGROUND OF THE INVENTION (1) Field of the Invention

The present invention relates to fixing an object to a tree.

(2) Description of Related Art

Fixing objects to trees can cause damage. This is particularly the case when several fixtures have to be made, for example cable clips for when a lightning protection system. Conventionally, plastic or metal nails or screws are used for this purpose. However, as the tree grows these and the cable clips can become fully embedded in the tree and cause disfigurement. This is particularly a problem for rare or "veteran" trees which are of scientific or historical value.

BRIEF SUMMARY OF THE INVENTION

According to one aspect of the present invention there is provided a device for fixing an object to a tree, the device including:

an elongate body, one end of which is adapted for attachment to a tree, in use an object being slidably mounted on the elongate body, and a device for biasing an object slidably mounted on the elongate body towards the end of the body adapted for attachment to the tree, in use, pressure resulting from growth of the tree being transmitted to the object and pushing it along the elongate body against the bias and away from the tree.

The inventor has found that using such a device that means that it is possible to reduce the risk of the object becoming embedded within the tree. Although parts of the device such as the elongate body may become embedded, these tend to be relatively small and/or cylindrical in shape and so cause less disfigurement of the tree. The elongate body may be adapted for attachment to a tree by being fitted with a fixing member. The fixing member may taper to a sharp end point. The fixing member can be provided with a screw thread for helping insert it into the tree and keep it in place.

The biasing device may apply pressure that is usually slightly lower than that pressure resulting from expansion of a growing tree, e.g. 7-8 kg/cm$^2$. The biasing device may be formed of a resilient material. In one embodiment the biasing device comprises a compression spring.

One end of the biasing device may abut the object. Alternatively, a component, such as a washer or a ring, may be slidably mounted on the elongate body between the object and the tree so that the tree at least partially contacts the component, which transmits the pressure to the object.

The elongate body may be comprised of a plurality of elongate members, each of which may be generally cylindrical and/or have a smooth surface. The plurality of elongate members may be connected together by means of corresponding threaded projections and bores. The length of the elongate body can therefore be extended by inserting further elongate members.

Some or all of the components forming the device may be formed of plastics or metal, such as stainless steel. The object may be part of a lightning protection system for the tree, e.g. a cable clip.

According to another aspect of the present invention there is provided a device for fixing an object to a tree, the device including:

an elongate body, one end of which is adapted for attachment to a tree;

an object slidably mounted on the elongate body, and a device for biasing the object towards the end of the body adapted for attachment to the tree, in use, pressure resulting from growth of the tree being transmitted to the object and pushing it along the elongate body against the bias and away from the tree.

According to yet another aspect of the invention there is provided a lightning protection system for a tree including a device substantially as described herein.

Whilst the invention has been described above, it extends to any inventive combination of the features set out above or in the following description.

BRIEF DESCRIPTION OF THE DRAWINGS

The invention may be performed in various ways, and, by way of example only, an embodiment thereof will now be described, reference being made to the accompanying drawings, in which.

DETAILED DESCRIPTION OF THE PREFERRED EMBODIMENT

Figure 1:
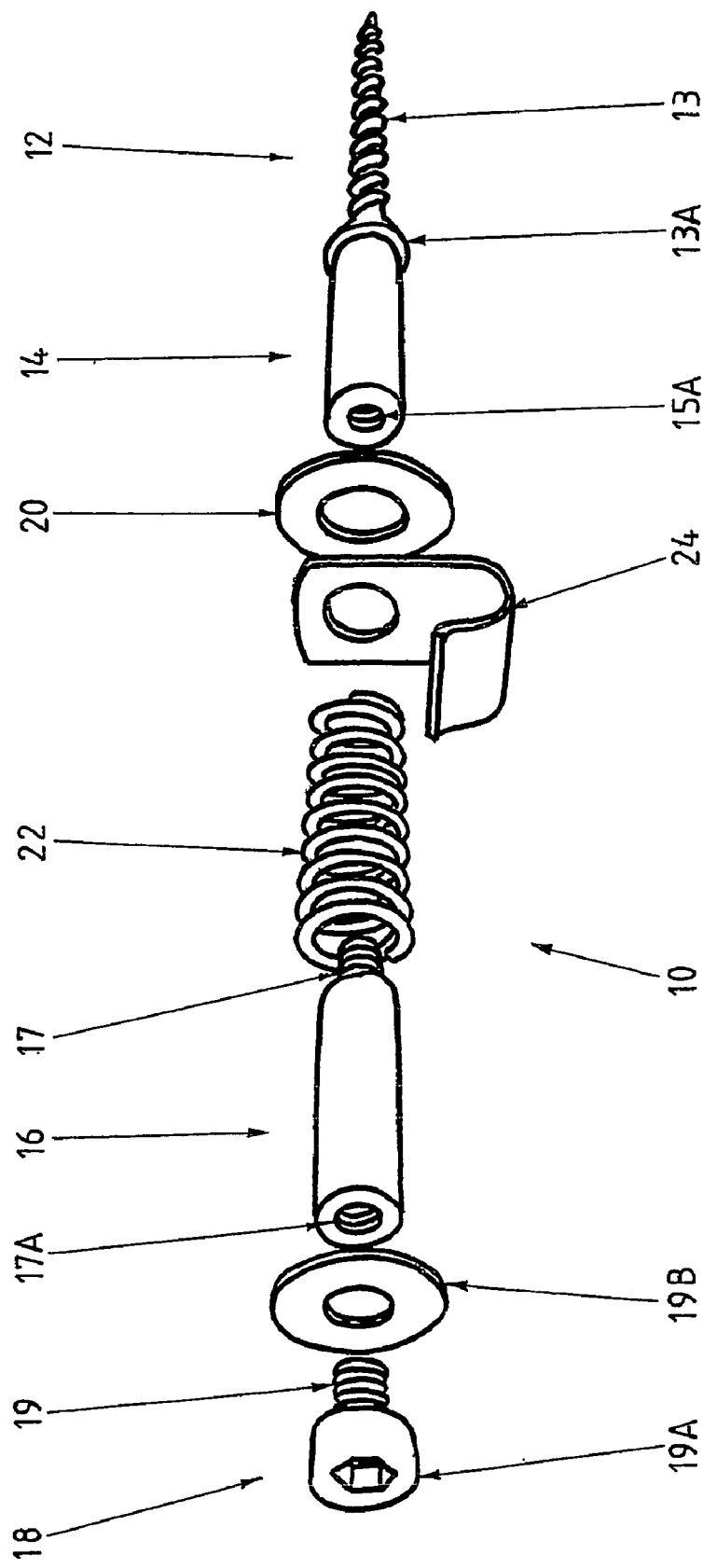
FIG. 1 is an exploded diagram of an embodiment of the device.

The device is generally indicated at 10 in FIG. 1. The device 10 includes four main components 12, 14, 16, and 18 which make up an elongate body. The screw-like component 12 located at one end of the elongate body acts as a fixing member. The component 12 has a head portion 13A leading to a tapering portion 13 that in turn leads to a sharp pointed end. The tapering portion 13 is provided with a screw thread. Within the free end of the head portion 13A there is a threaded blind bore. In an alternative embodiment, the fixing portion 12 may include separate head and thread portions.

The device 10 has a central portion which, in the example, is formed of two substantially cylindrical components 14, 16 that have smooth curved outer surfaces. A threaded projection extending from one end of the cylindrical component 14 fits into the blind bore of the fixing component 12. The other end of the cylindrical component 14 includes a threaded blind bore 15A. The component 16 is substantially identical to the component 12 and has a threaded projection 17 which is used to connect it to the bore 15A of the component 14.

The other end of the component 16 has a blind bore 17A. It will be appreciated that further components such as the components 14 or 16 can be used to extend the overall length of the device 10. It will also be understood that the components making up the central portion need not be identical in length. Alternative means of attaching the components together can be used, e.g. adhesives or clips.

When the device is assembled the components 12, 14, 16 will usually be screwed together first. Optionally, a washer 20 is then be slipped onto the elongate body formed by the components, the washer abutting the head 13A of the fixing component 12, which helps prevent it from sliping onto the tapering portion 12. An object to be fixed to the tree, such as cable clip 24, can then be threaded onto the device so that it abuts the washer 20 (if fitted). The cable clip 24 has a central aperture of a diameter substantially similar to that of the cylindrical components 14, 16. This type of clip is particularly suitable for use with the device, but it will be appreciated that the object could be any suitable body that needs to be fixed to a tree.

A compression spring 22 is then fitted over the cylindrical components 14, 16 to encircle them. A first end of the spring 22 abuts the cable clip 24. The spring 22 has a diameter slightly greater than that of the central cylindrical portions of the device so that it can easily be compressed/uncompressed.

The final stage of assembling the device 10 normally involves screwing an end piece 18 into the bore 17A of the component 16. The end piece 18 can be a nut having a threaded projection 19 and a head portion 19A having a diameter greater than that of the cylindrical components 14, 16. A second optional washer 19B can be fitted between the head portion 19A and the cylindrical component 16. If this is done then a second end of the spring 22 will normally abut the washer 19B instead of the head 19A.

Figure 2:
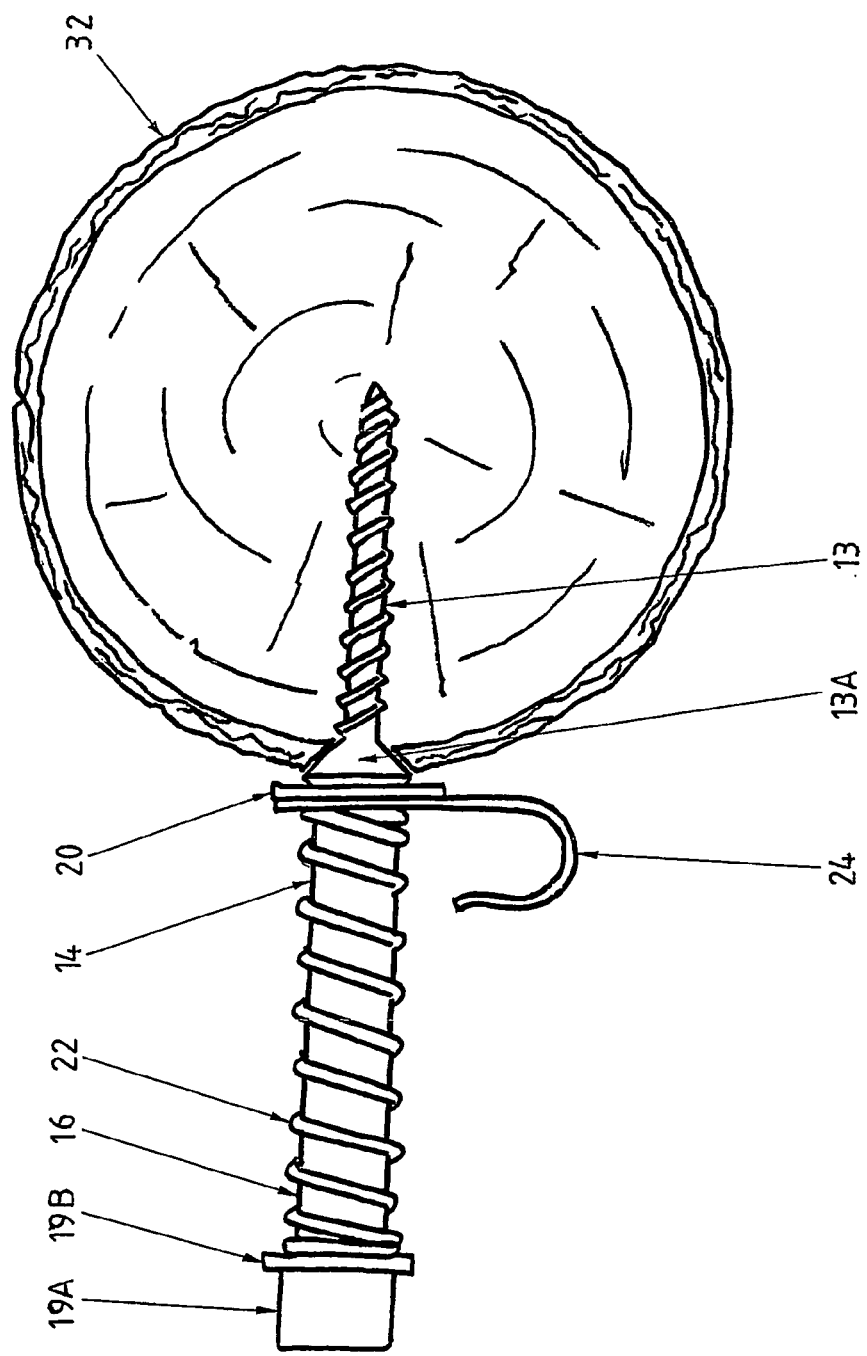
FIG. 2 illustrates schematically the device in use.

Turning to FIG. 2, the device is shown fixing the cable clip 24 to a tree 32. The threaded portion 13 and possibly part of the head portion 13A is screwed/pushed into the side of the tree. Thus, the device 10 can project outwards from the side of the tree at an angle of around 90°. The bias provided by the spring 22 helps retain the clip 24 adjacent the outer surface of the tree 32. Thus, in the case of an object that is not threaded onto the device 10, pressure from the spring can retain it on the body of the device during normal use. In an alternative embodiment, a tube of resilient material or a plurality of springs may be used to provide the bias on the object.

A growing tree will typically exert an outward pressure of around 8.44 kg/cm$^2$ (120 psi). The spring 22 is selected so that it can exert a pressure slightly lower, e.g. 10%, than this so that is does not substantially inhibit the growth of the tree. Typically the pressure exerted by the spring may be in the range of 7-8 kg/cm$^2$. As the tree grows, the washer 20 and the clip 24 are pushed against the bias of the spring 22 towards the end piece 18 of the device 10, which can help prevent the clip 24 at least from becoming embedded in the tree.

A version of the device tested by the inventor includes cylindrical components 14, 16 which provide a total length of around 8 cms and a diameter of around 7 mm. The device further comprises a compression spring of around 56 mm in length in its uncompressed state and a diameter of around 10 mm. These components are estimated to prevent the clip from being embedded by the tree for around five years after it has been fitted. Thus, the device may not need any modifications or attention over this period.

The tree may eventually grow to a size which would mean that the clip 24 is in danger of being embedded or causing damage to the tree or the device is at risk of failing. At this point the end piece 18 of the device can be removed and a further smooth cylindrical portion can be fitted. It may also be necessary or desirable to replace the spring 22 with another one having different dimensions to exert a pressure of a different magnitude. The end piece 18 is then replaced so that pressure is again exerted on the clip 24.

The embodiments described above can be produced at low cost. The components are typically formed of durable materials such as plastic or metal, e.g. 316 stainless steel, which are intended to damage the tree as little as possible if they become embedded. The device can therefore provide a cheap and reliable way of attaching an object to a tree whilst reducing the risk of damage.

The invention claimed is:

1. A device for fixing an object to a tree, the device including:
   an elongate body, one end of which elongate body is adapted for attachment to a tree, the elongate body being comprised of a plurality of elongate members removably joined together, and a length of the elongate body being adjustable by an addition of another elongate member being joined to a terminal one of the joined elongate members,
   an object being slidably mounted on the elongate body, and
   a biasing member biasing the object slidably mounted on the elongate body towards the end of the body adapted for attachment to the tree,
   in use, pressure resulting from growth of the tree being transmitted to the object and pushing the object along the elongate body against the bias of the biasing member and away from the tree,
   wherein one end of the biasing member abuts the object.

2. A device according to claim 1, wherein the elongate body is adapted for attachment to a tree by being fitted with a fixing member.

3. A device according to claim 2, wherein the fixing member tapers to a sharp end point.

4. A device according to claim 2, wherein the fixing member is provided with a screw thread for helping insert the fixing member into the tree and keep the fixing member in place.

5. A device according to claim 1, wherein the biasing member applies pressure that is usually slightly lower than that pressure resulting from expansion of a growing tree.

6. A device according to claim 1, wherein the biasing member is formed of a resilient material.

7. A device according to claim 1, wherein the biasing member comprises a compression spring.

8. A device according to claim 1, further including a component that is slidably mounted on the elongate body between the object and the tree so that the tree at least partially contacts the component, the component at least partially transmitting the pressure to the object.

9. A device according to claim 1, wherein the elongate members are generally cylindrical.

10. A device according to claim 1, wherein components forming the device are formed of plastics or metal material.

11. A device according to claim 1, wherein the biasing member applies pressure in the range of 7-8 kg/cm$^2$.

12. A device according to claim 1, further including a washer or a ring slidably mounted on the elongate body between the object and the tree so that the tree at least partially contacts the washer or ring so that the washer or ring at least partially transmits the pressure to the object.

13. A device for fixing an object to a tree, the device including:
   an elongate body, one end of which is adapted for attachment to a tree, the elongate body being comprised of a plurality of elongate members joined together, each elongate member removably engageable with another one of the elongate members so that an overall length of the elongate body is adjustable by an addition of a further one of the elongate members to the joined together elongate members;
   an object slidably mounted on the elongate body,
   a bearing surface located at a distalmost end of a terminal one of the joined elongate members, and
   a biasing member biasing the object towards the end of the body adapted for attachment to the tree, the biasing member having one end bearing against the object and another end bearing against the bearing surface,
   in use, pressure resulting from growth of the tree being transmitted to the object and pushing the object along the elongate body against the bias of the biasing member and away from the tree.

14. A device for fixing an object to a tree, comprising:
   an elongate body, the elongate body comprised of i) a first terminal end comprised of a screw component located at one end of the elongate body, the screw component have a threaded blind bore, ii) a central portion joined to the screw component and comprised of plural elongate members joined together, each elongate member having a threaded blind bore and a threaded projection, and iii) a second terminal end piece joined to a terminal end of the central portion and comprised of a threaded projection, the central portion having an extendable length by an addition of a further elongate member between the second terminal end piece and the terminal end of the central portion;

a bearing surface located at the terminal end of the central portion;

an object to be fixed to the tree having a central aperture slidingly fitted around the central portion; and a compression member fitted over the central portion with a first end bearing against the object and a second end bearing against the bearing surface, the compression member providing a bias against the object towards the first terminal end, in use, pressure resulting from growth of the tree being transmitted to the object and pushing the object along the elongate body against the bias of the biasing member and away from the tree.

15. The device of claim 14, wherein the bearing surface is a washer.

16. The device of claim 14, wherein the bearing surface is an integral part of the second terminal end piece.

17. A device for fixing an object to a tree, the device including:

an elongate body, one end of which elongate body is adapted for attachment to a tree, the elongate body being comprised of a plurality of elongate members removably joined together, and a length of the elongate body being adjustable by an addition of another elongate member being joined to a terminal one of the joined elongate members;

an object being slidably mounted on the elongate body;

a biasing member biasing the object slidably mounted on the elongate body towards the end of the body adapted for attachment to the tree, and a component that is slidably mounted on the elongate body between the object and the tree so that the tree at least partially contacts the component, the component at least partially transmitting the pressure to the object, in use, pressure resulting from growth of the tree being transmitted to the object and pushing the object along the elongate body against the bias of the biasing member and away from the tree.

* * * * *